April 18, 1961 M. GOLDMAN 2,979,777
TUBULAR FILM STRETCHING PROCESS
Filed Nov. 6, 1958
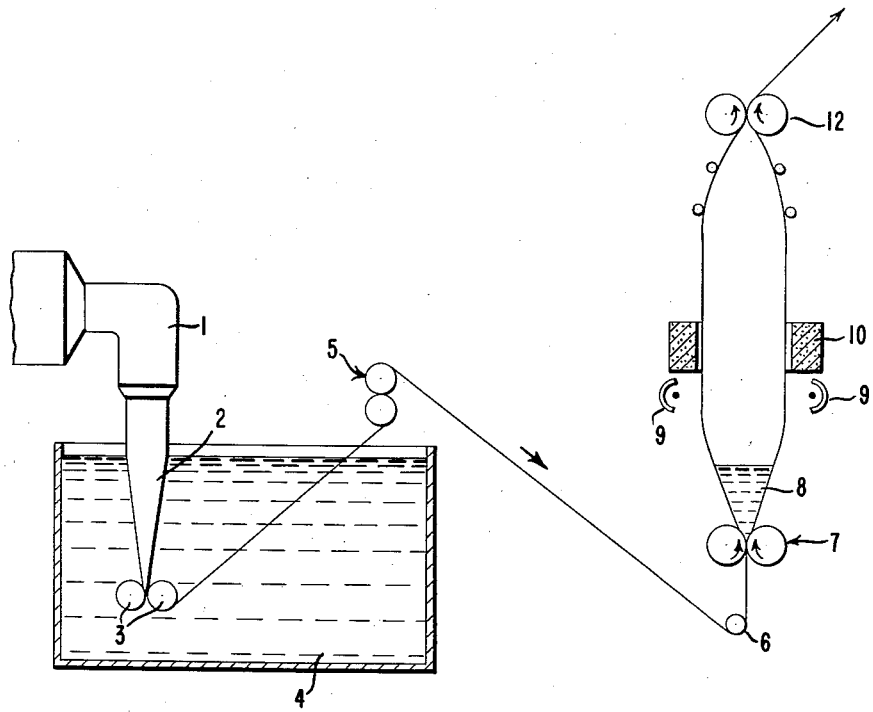
INVENTOR
MAX GOLDMAN
BY *A. Ralph Snyder*
ATTORNEY

United States Patent Office 2,979,777
Patented Apr. 18, 1961

2,979,777
TUBULAR FILM STRETCHING PROCESS

Max Goldman, Tonawanda, N.Y., assignor to E. I. du Pont de Nemours and Company, Wilmington, Del., a corporation of Delaware Filed Nov. 6, 1958, Ser. No. 772,281
20 Claims. (Cl. 18—57)

This invention relates to the manufacture of oriented, thermoplastic, organic, polymeric film, and more particularly to a process for orienting organic, thermoplastic, polymeric, thin film in continuous tubular form.

Organic, thermoplastic, polymeric films, such as polyethylene terephthalate, polyvinyl chloride, etc., in their oriented form possess many unique desirable characteristics such as enhanced physical, chemical and electrical properties which make these films ideally suited for a great variety of end uses in the packaging, electrical and decorative fields.

One method for the preparation of oriented, organic, thermoplastic, polymeric films which has proven to be highly satisfactory from the standpoints of efficiency and economy comprises orienting the film in continuous tubular form. Biaxial orientation is carried out by inflating the film tubing with air (lateral stretch) while stretching the tubing between two sets of pinch rolls operating at different speeds (longitudinal stretch). The quantity of air required for inflating the tube is introduced periodically by injection from a high pressure source. One major disadvantage of this system, however, arises from the fact that in order to maintain the expansion of the tubing the air must be replenished at frequent intervals to compensate for constant air leakage from the system. Also, as a result of this constant leakage, wide variations in pressure result making it difficult to maintain uniform control of the pressure system.

It is the principal object of this invention, therefore, to provide a pressure control system for the continuous tubular stretching of organic, thermoplastic, polymeric film passing between pinch rolls which makes possible close control of the system pressure, materially eliminates wide pressure fluctuations, minimizes the frequency of replenishing the pressure medium, and allows for the maintenance of constant orientation and constant dimensions of the tubing. The foregoing and additional objects will more clearly appear from the description which follows.

These objects are realized by the present invention which, briefly stated, comprises in the process wherein continuous tubular film of thermoplastic, organic, polymeric material, continuously traveling in a substantially vertical path, is stretched between spaced lower and upper sets of positively driven pinch rolls, the improvement which comprises maintaining vapor in the tubular film between the sets of pinch rolls at a constant pressure sufficient to transversely expand (stretch) the tubular film to the desired extent, said vapor being chemically inert with respect to said polymeric material. More specifically, the improvement comprises confining a pool of volatile liquid, chemically inert with respect to said polymeric material, in the continuous tubular film at the nip formed between the lower set of pinch rolls, said volatile liquid being liquid at 20° C. and being capable of exerting, at an elevated temperature below the stretching temperature at which molecular orientation of the film is effected, a vapor pressure effective to expand the tubular film at said stretching temperature to the desired extent, maintaining the pool at said elevated temperature, maintaining the tubular film in a stretching zone above the liquid level of the liquid pool at said stretching temperature, and quenching the stretched tubular film in a zone below the upper set of pinch rolls.

The principles and practice of the present invention will be more clearly understood by referring to the accompanying drawing wherein the single figure (Figure 1) is a diagrammatic representation of a preferred embodiment for carrying out the process of this invention.

Referring to the drawing, molten thermoplastic material is extruded from a conventional melt-extrusion device (not shown) through an annular die orifice 1 in the form of continuous tubing 2 which is drawn vertically downward from the die to a quench bath 4 where it is rapidly cooled. Collapse of the tubing may be prevented by the insertion through the die of a small quantity of the volatile liquid to be used (as the expanding agent) in the stretching step to follow. The quench tubing is converged (flattened) between a set of nip rolls 3 which is also vertically aligned in the bath with the annular die. The converged tubing is then guided from the bath over and between squeeze rolls 5 to remove excess bath liquid. It is to be understood that the above procedure is but one method which may be successfully utilized in the melt extrusion of thermoplastic film-forming material. Any other conventional modifications such as horizontal extrusion or air quenching may be utilized. After passing through the squeeze rolls 5, the tubing passes over an idler roll 6 and is passed through the nip of two vertically aligned, spaced sets of pinch rolls 7 and 12. After the tubing is threaded through the lower set of pinch rolls 7, the expanding agent, which must be a liquid at room temperature, is placed in the tubing and the tubing is sealed by passing it through the upper set of pinch rolls 12.

The volatile liquid, which is inert to the extruded film tubing and which forms a liquid reservoir 8 in the tubing just above the lower set of pinch rolls, must be capable of volatilizing when heated to a temperature above room temperature (20° C.) and below the temperature at which melocular orientation is effected by the stretching of the thermoplastic, organic, polymeric material to give the necessary vapor pressure required to stretch the tubing to the desired extent at the stretching temperature. The liquid is brought to the desired volatilizing temperature either by means of contact with the lower set of nip rolls which may be heated by any conventional means or by immersing the lower set of pinch rolls and that portion of the tubing containing the volatile liquid in a hot water bath. The tubing, containing vapor at the pressure required for stretching, then passes through a set of radiant heaters 9 where the temperature of the tubing is raised to that required for stretching, e.g., in the case of polyvinyl chloride tubing, 80–110° C. The vapor pressure of the expanded gas from the volatilizing liquid now causes the tubing to further expand and be stretched laterally. The requisite stretching caused by the expansion of the tubing occurs essentially instantaneously as the film is heated to the requisite temperature by radiant heaters or a heated porous surface, and the thus laterally stretched tubing may then be rapidly quenched by passing the tubing through a porous quenching ring 10 which rapidly cools the tubing by means of cool air forced through the ring. After quenching, the tubing passes through the cold (room temperature) nips of the upper set of pinch rolls and may be slit and wound up as stretch flat film. In a preferred embodiment of this process, longitudinal stretching of the tubing is effected essentially simultaneously along with the lateral stretching by means of rotating the upper set of pinch rolls at a speed greater than the lower, the amount of stretch being controlled by differential speeds of the two sets of driven rolls.

The selection of the volatile inert liquid will depend on (1) the vapor pressure required to stretch the organic, thermoplastic material, and (2) the temperature range over which stretching of this material takes place. The critical limitations for the liquid are that it must be a liquid at room temperature (20° C.) to reduce losses due to volatilization, and have a vapor pressure equal to the desired stretching pressure over the range of working temperatures, i.e., above room temperature and below the softening point of the organic, thermoplastic, polymeric material. For example, in the case of polyvinyl chloride film 7 mils or less in thickness, the pressure required for stretching is 15.0–15.3 pounds per square inch absolute (p.s.i.a.). The following table shows the temperatures at which various volatile materials (liquid at 20° C. and inert with respect to polyvinyl chloride) would have to be heated to exert a vapor pressure within the range of 15.0–15.3 p.s.i.a.

TABLE I

| Chemical Name | Formula | Temperatures at which Compound exerts 15–15.3 p.s.i.a., ° C. |
| --- | --- | --- |
| 1. Trichloromonofluoromethane | $CCl_3F$ | 23–24 |
| 2. n-Pentane | $CH_3(CH_2)_3CH_3$ | 36–38 |
| 3. Methylene chloride | $CH_2Cl_2$ | 40–42 |
| 4. Trichlorotrifluoroethane | $CCl_2FCClF_2$ | 47–49 |
| 5. Carbon disulfide | $CS_2$ | 47–49 |

The above temperatures are arrived at by experimentally determining the vapor pressure at various temperatures above 20° C., and plotting the results as a graph of vapor pressure v. temperature. That portion of the curve in the pressure range required to stretch the given film defines the temperatures to which the liquid must be heated.

Similarly, calculations can be made for compounds or mixtures of compounds which may be suitable for the molecular orientation of other thermoplastic materials, by means of this process. Table II, below, lists the conditions suitable for carrying out the process of the present invention utilizing polyethylene terephthalate, linear polypropylene and polyvinyl fluoride including the pressures necessary for stretching these materials and the effective stretching temperature ranges for these compounds.

TABLE II

| Polymer | Pressure Required in Inches of Water | Pressure in p.s.i.a. | Range of Stretching Temperature, ° C. |
| --- | --- | --- | --- |
| 1. Polyethylene Terephthalate | 8–18 | 15.0–15.4 | 85–110 |
| 2. Linear Polypropylene | 6–20 | 14.9–15.5 | 110–150 |
| 3. Polyvinyl Fluoride (50% Solvent-Butyrolactone) | 4–12 | 14.8–15.1 | 75–120 |

The crux of this invention lies in confining a liquid whose vapor pressure-temperature characteristics render it capable of exerting the desired stretching force upon the polymeric tubing when the temperature of the tubing passing between the two sets of pinch rolls is raised to a point at which the applied pressure effects a stretching action on the tubing. Required stretching pressure will be maintained as long as the liquid is maintained at the requisite temperature and is confined between the nips of the two sets of pinch rolls. The problem of leakage and the resulting necessity of replenishing the system pressure is thus kept at a minimum, and the control of the pressure system is greatly facilitated as a result of the diminishing variations in pressure. Maintenance of constant orientation and dimensions of the tubing are greatly facilitated.

The temperature of the confined liquid is maintained at the point at which its vapor pressure just supplies the necessary force required to stretch the film. This is a critical feature of the invention as too low a temperature would produce an insufficient vapor pressure to effect the required stretching, and too high a temperature would create a higher vapor pressure and might easily cause overexpansion and therefore bursting of the tubing. Although the temperature of the tubing is raised well above that of the confined volatilized liquid in the tubing as the tubing passes between the radiant heaters in order to effect stretching action upon the film, the volume of the gas subjected to these higher temperatures compared to gas volume enclosed in the expanding tubing is negligible, and the time of exposure is such that the vapor pressure of the confined volatile liquid is not raised beyond the critical limits.

Although the process of the present invention is applicable to all organic thermoplastic materials capable of being melt-extruded, particular emphasis will be placed in the descriptive examples to follow, on the treatment of those polymers which are readily obtainable in crystalline form. As examples of organic thermoplastic materials which are extrudable in accordance with the process of the present invention, there may be mentioned: polyethylene, including linear polyethylene, copolymers of polyethylene, linear polypropylene, polyvinyl chloride, polyvinylidene chloride, polyvinylidene fluoride, polyoxymethylene resin, polystyrene, polyethylene terephthalate, copolymers of tetrafluoroethylene and perfluoropropene, as well as those crystallizable organic, polymeric substances normally not capable of being melt-extruded to which sufficient quantities of appropriate solvents have been added to render them melt-extrudable. Percentage compositions in the following examples are by weight unless otherwise indicated.

EXAMPLE 1

A polyvinyl chloride formulation consisting of 93.5% polyvinyl chloride ("Dow" 111-4, Dow Chemical Co.), 3.5% dibutyl tin thioester ("Thermolite" 31, Metal Thermite Co.) and 3% "Lubricin" V-3 (modified castor oil consisitng principally of gylceryl triricinoleate, W. B. Baker Castor Oil Co.), was extruded at a temperature of 190° C. through a 1" extruder (National Rubber Machinery Co.), having a barrel length to diameter ratio (L/D) of 18, and equipped with a Robbins 2" die; said die being maintained at a temperature of 200° C. Employing the arrangement of apparatus diagrammed in the drawing, the tubing was downwardly extruded into a water quench bath maintained at 18° C. Collapse of the film was prevented by the addition through the die of a small amount of "Freon" 11 (trichloromonofluoromethane, E. I. du Pont de Nemours & Co.). The film was drawn through the nip rolls in the quench at a speed of 13.5 feet/minute. The quenched tubing was passed between a pair of squeeze rolls, passed over an idler roll and then sent through the nip of a set of pinch rolls, the rolls consisting of one metal surface roll and one roll coated with a rubbery material ("neoprene"). The tubing after passing through the nip was filled with "Freon" 11 such that a liquid reservoir was formed between the nips of the lower set of rolls to a level about 2" high. The tubing was then drawn vertically upward through a heating zone, a quenching zone, and finally through the nip of a second set (upper) of pinch rolls identical with the first set, thus sealing the tubing. The lower set of rolls was rotated at a speed of 13.8 feet per minute and heated to 30–32° C. (imparting a temperature of 24–25° C. to the volatile liquid) thereby causing the "Freon" 11 to volatilize to give a pressure of approximately 15 p.s.i.a. within the tubing. Lateral stretching of the tubing took place when the upwardly moving tubing passed between sets of radiant heaters (heating zone) which heated the tubing to the stretching temperature (120° C.). Longitudinal stretching was effected essentially simultaneously with that of the lateral stretching by rotating the upper set of pinch rolls at a speed of 27.5 feet per minute.

The stretched tubing was then quickly quenched (quenching zone) by means of cool air forced through a porous quench ring stationed immediately above the radiant heaters, conveyed through a series of guide (flattening) rolls into the nips of the upper set of cold rolls, and thence wound up. Samples of the tubing prepared in the manner described above were tested to determine the physical properties. Table III, below, lists the properties of tubing stretched by this vapor pressing technique, as compared with those of as cast (non-oriented) tubing. Listed are the thickness in mils, pneumatic impact (kilograms-cm./mils) and tear strengths, thickness, tenacity, elongation and modulus in both the longitudinal (LD) and transverse (TD) directions.

TABLE III

*Properties of polyvinyl chloride film tubing prepared by vapor pressure stretching with a volatile liquid*

|  | As-Cast (Non-Oriented) Polyvinyl Chloride Tubing | Vapor Pressure Stretched Tubing |
|---|---|---|
| Pneumatic Impact Strength (kg.-cm./mil) | 0.42 | 4.67 |
| Thickness, mils, LD/TD | 8.9/10.1 | 2.2/2.4 |
| Tenacity (p.s.i.), LD/TD | 8,550/5,220 | 17,400/12,400 |
| Elongation (Percent), LD/TD | 276/168 | 89/127 |
| Modulus (p.s.i.), LD/TD | 317,200/163,200 | 344,800/286,900 |
| Tear Strength (grams/mil), LD/TD | 55/— | 25/23 |

EXAMPLE 2

Polyethylene terephthalate was extruded at 275° C. through a 2″ Robbins circular die by means of a 1″ National Rubber Machinery Extruder. The die opening was 30 mils. The extruder tubing was quenched by means of a 1⅞″ diameter water cooled porous mandrel, attached to the circular die. After quenching, the film tubing was stretched in the manner described in Example 1. The lower tubing set of pinch rolls was rotated at a speed of 14 feet per minute and was heated to 35° C. (thereby imparting a temperature of 24–25° C. to the volatile liquid). At the start of the run, "Freon" 11 was placed in the tubing. Lateral stretching of the tubing took place when the upwardly moving tubing passed between sets of radiant heaters which heated the tubing to the stretching temperature (85–110° C.). The tubing stretched under the influence of the temperature and pressure in the stretching zone. The expansion was controlled and quenching rapidly effected by means of a porous quench ring located immediately above the radiant heaters. The upper set of nip rolls was operated at a speed of 21 feet per minute thereby effecting longitudinal stretching. Samples of the tubing prepared in the manner described above were tested to determine the physical properties. Table IV, below, lists the properties of tubing as compared with those of as-cast (non-oriented) tubing. Listed are the pneumatic impact strengths in kg.-cm./mil, the thickness in mils, and the tenacity in both the longitudinal and transverse directions.

TABLE IV

*Properties of polyethylene terephthalate film tubing prepared by vapor pressure stretching with a volatile liquid*

|  | As-Cast (Non-Oriented) Polyethylene Terephthalate Tubing | Vapor Pressure Stretched Tubing |
|---|---|---|
| Pneumatic Impact Strength (kg.-cm./mil) | 0.6 | 4.5 |
| Thickness, mils | 2.8 | 0.3 |
| Tenacity (p.s.i.), LD/TD | 6,290/5,250 | 9,190/12,100 |

That the film obtained by this technique was oriented is shown by the increased pneumatic impact strength and tenacity of the resulting film.

EXAMPLE 3

Linear polypropylene (Moplen M-2—Montecatini) was extruded at 300° C. through a 2″ Robbins die by means of a 1″ National Rubber Machinery Extruder. The extruded tubing was then passed over a 1⅞″ water cooled mandrel partially immersed in a water bath maintained at 5° C. The quenched tubing was then passed into a heated tank maintained at 32° C. and threaded into the lower set of pinch rolls of a pinch roll stretching apparatus as in the previous examples except that the lower set of pinch rolls was completely immersed in a heated water bath. "Freon" 11 was placed in the tubing as it was threaded through the lower set of pinch rolls and the temperature brought up to 24–25° C. by means of the heating bath thereby giving the required volatilization pressure (14.9–15.5 p.s.i.a.). Lateral stretching of the tubing took place when the upwardly moving tubing passed between sets of radiant heaters which heated the tubing to the stretching temperature (110–150°C.) The expansion was controlled and quenching rapidly effected by means of a porous quench ring located immediately above the radiant heaters. The lower set of pinch rolls was operated at a speed of 12 feet per minute and the upper set of pinch rolls was operated at a speed of 33 feet per minute thereby effecting longitudinal stretching. Samples of the tubing prepared in the manner described above were tested to determine the physical properties. Table V, below, lists the properties of tubing as compared with those of as-cast (non-oriented) tubing. Listed are the pneumatic impact strengths in kg.-cm./mil and the tenacity in both the longitudinal and transverse directions.

TABLE V

*Properties of linear polypropylene film tubing prepared by vapor pressure stretching wtih a volatile liquid*

|  | As-Cast (Non-Oriented) Linear Polypropylene Tubing | Vapor Pressure Stretched Tubing |
|---|---|---|
| Pneumatic Impact Strength (kg.-cm./mil) | 1.2 | 5.1 |
| Tenacity, LD/TD (p.s.i.) | 3,300/3,280 | 13,800/23,500 |

The present invention provides a unique and improved process for maintaining uniform pressure control for the continuous lateral stretching of organic thermoplastic polymeric tubing. The utilization of a reservoir of liquid which volatilizes at temperatures within a practical operating range gives the requisite pressure for stretching and insures not only a much finer control of the system, but also greatly reduces the frequency of replenishing the system pressure. The system is ideally suited for continuous extrusion-orientation operations wherein replenishment of the expansible liquid is totally alleviated by the use of continuous small amounts of liquid in the extrusion step to prevent collapse of the tubing, which liquid is pumped through the tubing to the reservoir of liquid in the tubing above the lower pinch rolls. Thus, the level of the volatile liquid in the tubing is kept constantly at the required level without the requirement of adding additional liquid during the stretching step by means of probes through the nips, or by temporarily ceasing operations. Constant orientation and dimensions of the film tubing are realized.

I claim:

1. In the process wherein continuous tubular film of thermoplastic, organic, polymeric material continuously traveling in a substantially vertical path is stretched between spaced lower and upper sets of positively driven pinch rolls, the improvement which comprises confining a pool of volatile liquid chemically inert with respect to said polymeric material in the continuous tubing between said sets of pinch rolls at the nip formed between the rolls of the lower set of pinch rolls, said volatile liquid being liquid at 20° C., and being capable of exerting at an elevated temperature below the stretching temperature at which molecular orientation of said film is effected a vapor pressure effective to stretch the tubular film at the stretching temperature, and maintaining said tubular film in a stretching zone above the liquid level of the liquid pool at said stretching temperature.

2. The process of claim 1 wherein the upper set of pinch rolls is driven at a speed greater than the speed of the lower set of pinch rolls.

3. In the process wherein continuous tubular film of thermoplastic, organic, polymeric material continuously traveling in a substantially vertical path is stretched between spaced lower and upper sets of positively driven pinch rolls, the improvement which comprises confining a pool of volatile liquid chemically inert with respect to said polymeric material in the continuous tubing between said sets of pinch rolls at the nip formed between the rolls of the lower set of pinch rolls, said volatile liquid being liquid at 20° C., and being capable of exerting at an elevated temperature below the stretching temperature at which molecular orientation of said film is effected a vapor pressure effective to stretch the tubular film at the stretching temperature, maintaining the liquid pool at an elevated temperature sufficient to maintain the vapor of said liquid at a pressure effective to stretch the tubular film to a predetermined extent, maintaining the tubular film in a stretching zone above the liquid level of the liquid pool at said stretching temperature, and quenching the stretched tubular film in a zone below the upper set of pinch rolls.

4. The process of claim 3 wherein the upper set of pinch rolls is driven at a speed greater than the speed of the lower set of pinch rolls.

5. The process of claim 3 wherein the liquid in said pool is continuously replenished by liquid introduced into said tubing before said tubing passes between the rolls of said lower set of pinch rolls.

6. The process which comprises continuously passing continuous tubular film of polyvinyl chloride in a substantially vertical path between a lower and an upper set of pinch rolls, confining a pool of a volatile liquid chemically inert with respect to polyvinyl chloride in the continuous tubing between said sets of pinch rolls at the nip formed between the rolls of the lower set of pinch rolls, said volatile liquid being liquid at 20° C., and being capable of exerting at an elevated temperature below about 120° C. a vapor pressure of from 15.0–15.3 pounds per square inch absolute, maintaining the liquid pool at said elevated temperature, maintaining the tubular film in a stretching zone above the liquid level of the liquid pool at a temperature of about 120° C., and thereafter quenching said tubular film in a quenching zone below the upper set of pinch rolls.

7. The process of claim 6 wherein the upper set of pinch rolls is driven at a speed greater than the speed of the lower set of pinch rolls.

8. The process of claim 6 wherein said volatile liquid is trichloromonofluoromethane maintained at a temperature of from 23° to 24° C.

9. The process of claim 6 wherein the volatile liquid is n-pentane maintained at a temperature of from 36° to 38° C.

10. The process of claim 6 wherein the volatile liquid is methylene chloride maintained at a temperature of from 40° to 42° C.

11. The process of claim 6 wherein the volatile liquid is trichlorotrifluoroethane maintained at a temperature of from 47° to 49° C.

12. The process of claim 6 wherein the volatile liquid is carbon disulfide maintained at a temperature of from 47° to 49° C.

13. The process which comprises continuously passing continuous tubular film of polyethylene terephthalate in a substantially vertical path between a lower and an upper set of pinch rolls, confining a pool of a volatile liquid chemically inert with respect to polyethylene terephthalate in the continuous tubing between said sets of pinch rolls at the nip formed between the rolls of the lower set of pinch rolls, said volatile liquid being liquid at 20° C., and being capable of exerting at an elevated temperature below about 85° C. a vapor pressure of from 15.0 to 15.4 pounds per square inch absolute, maintaining the liquid pool at said elevated temperature, maintaining the tubular film in a stretching zone above the liquid level of the liquid pool at a temperature of from 85° to 110° C., and thereafter quenching said tubular film in a quenching zone below the upper set of pinch rolls.

14. The process of claim 13 wherein the upper set of pinch rolls is driven at a speed greater than the speed of the lower set of pinch rolls.

15. The process of claim 13 wherein the volatile liquid is trichloromonofluoromethane.

16. The process which comprises continuously passing continuous tubular film of linear polypropylene in a substantially vertical path between a lower and an upper set of pinch rolls, confining a pool of a volatile liquid chemically inert with respect to polypropylene in the continuous tubing between said sets of pinch rolls at the nip formed between the rolls of the lower set of pinch rolls, said volatile liquid being liquid at 20° C., and being capable of exerting at an elevated temperature below about 110° C. a vapor pressure from 14.9 to 15.5 pounds per square inch absolute, maintaining the liquid pool at said elevated temperature, maintaining the tubular film in a stretching zone above the liquid level of the liquid pool at a temperature of from 110° to 150° C., and thereafter quenching said tubular film in a quenching zone below the upper set of pinch rolls.

17. The process of claim 16 wherein the upper set of pinch rolls is driven at a speed greater than the speed of the lower set of pinch rolls.

18. The process of claim 16 wherein the volatile liquid is trichloromonofluoromethane.

19. The process which comprises continuously passing continuous tubular film of polyvinyl fluoride containing about 50% butyrolactone in a substantially vertical path between a lower and an upper set of pinch rolls, confining a pool of a volatile liquid chemically inert with respect to polyvinyl fluoride in the continuous tubing between said sets of pinch rolls at the nip formed between the rolls of the lower set of pinch rolls, said volatile liquid being liquid at 20° C., and being capable of exerting at an elevated temperature below about 75° a vapor pressure of from 14.8 to 15.1 pounds per square inch absolute, maintaining the liquid pool at said elevated temperature, maintaining the tubular film in a stretching zone above the liquid level of the liquid pool at a temperature of from 75° to 120° C., and thereafter quenching said tubular film in a quenching zone below the upper set of pinch rolls.

20. The process of claim 19 wherein the upper set of pinch rolls is driven at a speed greater than the speed of the lower set of pinch rolls.

References Cited in the file of this patent

UNITED STATES PATENTS

| 762,064 | Kepler | June 7, 1904 |
| 2,337,927 | Reichel et al. | Dec. 28, 1943 |
| 2,448,433 | Irons et al. | Aug. 31, 1948 |
| 2,516,552 | Clark et al. | June 25, 1950 |
| 2,688,773 | McIntire | Sept. 14, 1954 |
| 2,862,234 | Gerber | Dec. 2, 1958 |

FOREIGN PATENTS

| 524,777 | Great Britain | Aug. 14, 1940 |